Figure 1:
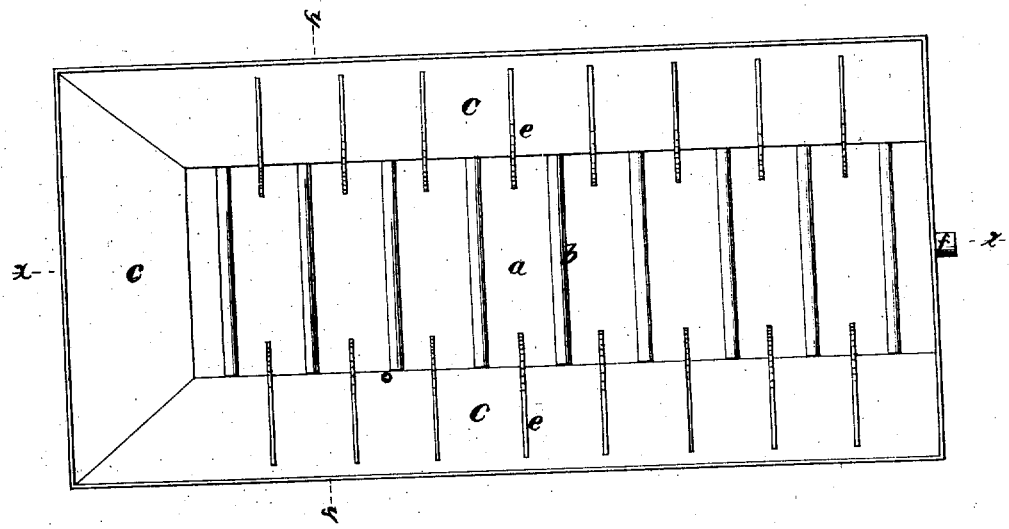

FRANCIS G. BUTLER.

Improvement in Saccharine Pans.

No. 4,528. Reissued Aug. 29, 1871.

*Witnesses.*

W. Bradford.
S. M. Pool

*Inventor:*

Francis G. Butler
by John J. Halsted
his Atty.

UNITED STATES PATENT OFFICE.

FRANCIS G. BUTLER, OF BELLOWS FALLS, VERMONT, ASSIGNOR TO HIMSELF AND JAMES B. WILLIAMS.

IMPROVEMENT IN EVAPORATING-PANS FOR SACCHARINE LIQUIDS.

Specification forming part of Letters Patent No. 112,319, dated March 7, 1871; reissue No. 4,528, dated August 29, 1871.

*To all whom it may concern:*

Be it known that I, FRANCIS G. BUTLER, of Bellows Falls, county of Windham and State of Vermont, have invented certain new and useful Improvements in Evaporating-Pans for Saccharine Liquids; and to enable others skilled in the art to make and use the same I will proceed to describe my invention, referring to the drawing, in which the same letters indicate like parts in each of the figures.

The nature of this invention consists in forming a pan with a system of scum-arresters, as hereinafter described; also, in combining the scum-arresters with a metal-pan bottom having a series of corrugated partitions; also, in an evaporating-pan having corrugations running across the width of the bottom sheet and having flaring sides, in combination with a system of scum-arresters forming elevated compartments upon the flaring sides; also, in the employment of flaring sides combined with scum-arresters in evaporating-pans; and also, in combining flaring metallic sides with an evaporator having a crimped or corrugated bottom. The width of the sheets which form the bottom also forms about the length of said corrugations. On each side, and about half-way between any two of the corrugations, are arranged scum-arresters, fitted to the bottom and sides of the pan and reaching inward to about one-fourth or more of its width, the upper edges of these scum-arresters extending thence by a gradual rise to nearly the top edges of the sides, the object of which is to arrest and hold the scum upon the sides, thus affording facility for gathering and removing it.

Figure 2:
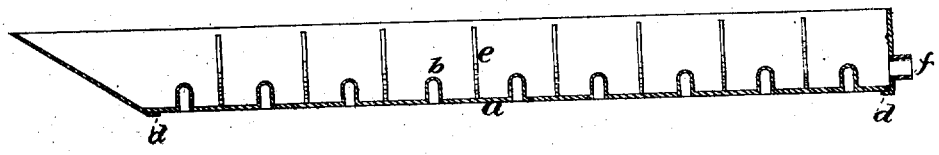
Figure 3:
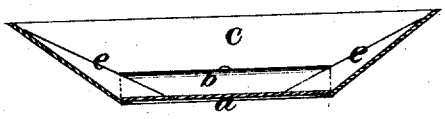

In the accompanying drawing, Figure 1 is a top or plan view of the pan. Fig. 2 is a vertical section through the center in the line *x x*, and Fig. 3 is a cross-section in the line *y y* of Fig. 1.

*a* is the bottom of the pan. *b* are the corrugations, of the same or nearly the same length as the width of the bottom sheet *a*. These corrugations are formed in the common way. The drawing illustrates a pan having broad flaring sides *c* formed at an angle of about forty-five degrees with the bottom, and having a lip or flange, *d*, which laps onto and is secured to the under side of the bottom *a*. *e e* are scum-arresters, arranged between a part or all of the corrugations, the lower edges extend onto the bottom about one-fourth or more of its width, and are fitted and secured to the flaring sides, and they also extend nearly to the top or outer edge thereof, thus forming elevated compartments upon the sides for arresting and holding the scums until removed, the walls of such compartments rising higher than the corrugations or partitions. *f* is a discharging-nozzle. The scum-arresters also serve an important purpose in bracing and holding the sides and bottom firmly in their proper relative positions, preventing either from sagging out of shape and in stiffening the whole structure of the pan, which is a highly-important object to be attained with evaporating-pans constructed wholly or mainly of sheet metal, and they should be firmly secured to both the sides and bottom. They may be applied to pans of almost any form of construction. During the process of evaporation the scums rising to the surface are thrown to the sides by the ebullition of the fluid, and into the elevated compartments formed upon the sides by the scum-arresters, and are there detained to be removed at the pleasure of the operator.

What I claim, and desire to secure by Letters Patent, is—

1. Scum-arresters applied to evaporating-pans, and operating as described.
2. The combination, with the scum-arresters, of a metal-pan bottom, having partitions, crimps, or corrugations in the metal.
3. An evaporating-pan having corrugations running across the width of the bottom sheet and having flaring sides, in combination with a system of scum-arresters forming elevated compartments upon the flaring sides.
4. The employment of flaring sides, in combination with scum-arresters, in evaporating-pans, substantially as and for the purposes set forth.
5. Flaring metallic sides, in combination with an evaporator having a crimped or corrugated bottom, with a level portion of the bottom between the crimps or corrugations.

FRANCIS G. BUTLER.

Witnesses:
JOHN J. HALSTED,
WILMER BRADFORD.

(108.)